(12) United States Patent
Zhang et al.

(10) Patent No.: US 11,618,844 B2
(45) Date of Patent: Apr. 4, 2023

(54) HIGH TEMPERATURE RESISTANT PORTLAND CEMENT SLURRY AND PRODUCTION METHOD THEREOF

(71) Applicants: China National Petroleum Corporation, Beijing (CN); CNPC Engineering Technology R&D Company Limited, Beijing (CN)

(72) Inventors: Hua Zhang, Beijing (CN); Jianzhou Jin, Beijing (CN); Shuoqiong Liu, Beijing (CN); Fengzhong Qi, Beijing (CN); Yongjin Yu, Beijing (CN); Ming Xu, Beijing (CN); Jinping Yuan, Beijing (CN); Zhiwei Ding, Beijing (CN); Chongfeng Zhou, Beijing (CN); Chi Zhang, Beijing (CN); Zishuai Liu, Beijing (CN); Yusi Feng, Beijing (CN); Yuchao Guo, Beijing (CN)

(73) Assignees: CHINA NATIONAL PETROLEUM CORPORATION, Beijing (CN); CNPC ENGINEERING TECHNOLOGY R&D COMPANY LIMITED, Beijing (CN)

( * ) Notice: Subject to any disclaimer, the term of this patent is extended or adjusted under 35 U.S.C. 154(b) by 668 days.

(21) Appl. No.: 16/260,055

(22) Filed: Jan. 28, 2019

(65) Prior Publication Data
US 2019/0241792 A1    Aug. 8, 2019

(30) Foreign Application Priority Data
Feb. 2, 2018    (CN) .......................... 201810104596.8

(51) Int. Cl.
| | | |
|---|---|---|
| C04B 14/04 | (2006.01) |
| C04B 14/06 | (2006.01) |
| C04B 14/34 | (2006.01) |
| C04B 24/00 | (2006.01) |
| C04B 24/16 | (2006.01) |
| C04B 28/04 | (2006.01) |
| C09K 8/48 | (2006.01) |
| C09K 8/487 | (2006.01) |

(Continued)

(52) U.S. Cl.
CPC .............. *C09K 8/48* (2013.01); *C04B 14/043* (2013.01); *C04B 14/066* (2013.01); *C04B 14/34* (2013.01); *C04B 24/003* (2013.01); *C04B 24/163* (2013.01); *C04B 24/166* (2013.01); *C04B 28/04* (2013.01); *C09K 8/467* (2013.01); *C09K 8/487* (2013.01); *C04B 2103/0029* (2013.01); *C04B 2103/0035* (2013.01); *C04B 2103/0036* (2013.01); *C04B 2103/20* (2013.01); *C04B 2103/408* (2013.01); *C04B 2103/46* (2013.01); *C04B 2103/50* (2013.01); *C04B 2111/763* (2013.01); *C04B 2201/20* (2013.01); *C04B 2201/50* (2013.01)

(58) Field of Classification Search
CPC .......... C09K 8/48; C09K 8/467; C09K 8/487; C04B 14/043; C04B 14/066; C04B 14/34; C04B 24/003; C04B 24/163; C04B 24/166; C04B 28/04; C04B 2103/0036; C04B 2103/0029; C04B 2103/0035; C04B 2103/20; C04B 2103/408; C04B 2103/46; C04B 2103/50; C04B 2201/20; C04B 2201/50; C04B 2111/763; C04B 2103/0028; C04B 14/06; C04B 24/00; C04B 24/30; C04B 28/00; C04B 14/04; C04B 24/16; C04K 8/487
See application file for complete search history.

(56) References Cited

U.S. PATENT DOCUMENTS

| | | | | |
|---|---|---|---|---|
| 4,274,881 | A * | 6/1981 | Langton | .................... C04B 7/00 |
| | | | | 106/702 |
| 2012/0073813 | A1* | 3/2012 | Zamora | .................. C09K 8/032 |
| | | | | 166/305.1 |
| 2019/0241792 | A1 | 8/2019 | Zhang et al. | |

FOREIGN PATENT DOCUMENTS

| | | |
|---|---|---|
| CN | 101234871 A | 8/2008 |
| CN | 102220114 A | 10/2011 |

(Continued)

OTHER PUBLICATIONS

CN-104371678-A (Liu), machine translation (Year: 2015).*

(Continued)

*Primary Examiner* — Kevin E Yoon
*Assistant Examiner* — Marites A Guino-O Uzzle
(74) *Attorney, Agent, or Firm* — Loza & Loza, LLP; Michael F. Fedrick

(57) ABSTRACT

The invention provides a high temperature resistant Portland cement slurry and a production method thereof. The high temperature resistant Portland cement slurry comprises the following components by weight: 100 parts of an oil well Portland cement, 60-85 parts of a high temperature reinforcing material, 68-80 parts of fresh water, 1-200 parts of a density adjuster, 0.1-1.5 parts of a suspension stabilizer, 0.8-1.5 parts of a dispersant, 3-4 parts of a fluid loss agent, 0-3 parts of a retarder and 0.2-0.8 part of a defoamer. The high temperature resistant Portland cement slurry has a good sedimentation stability at normal temperature, and develops strength rapidly at a low temperature. The compressive strength is up to 40 MPa or more at a high temperature of 350° C., and the long-term high-temperature compressive strength develops stably without degradation. Therefore, it can meet the requirements for field application in heavy oil thermal recovery wells, reaching the level of Grade G Portland cement for cementing oil and gas wells.

5 Claims, No Drawings

(51) Int. Cl.
*C09K 8/467* (2006.01)
*C04B 103/00* (2006.01)
*C04B 111/76* (2006.01)
*C04B 103/20* (2006.01)
*C04B 103/40* (2006.01)
*C04B 103/46* (2006.01)
*C04B 103/50* (2006.01)

(56) References Cited

FOREIGN PATENT DOCUMENTS

| CN | 102994058 A | | 3/2013 | |
|---|---|---|---|---|
| CN | 103756653 A | | 4/2014 | |
| CN | 104371678 A | * | 2/2015 | |
| CN | 104371678 A | | 2/2015 | |
| CN | 105255464 A | | 1/2016 | |
| CN | 105271962 A | | 1/2016 | |
| CN | 105295875 A | | 2/2016 | |
| CN | 105778876 A | | 7/2016 | |
| CN | 106986584 A | * | 7/2017 | C04B 28/00 |
| CN | 107244857 A | * | 10/2017 | |
| CN | 107244857 A | | 10/2017 | |
| CN | 108298902 A1 | | 7/2018 | |

OTHER PUBLICATIONS

CN-107244857-A (Xu), machine translation (Year: 2017).*
CN-106986584-A (Zhang), machine translation (Year: 2017).*
CN-106986584-A, Zhang, Abstract, machine translation (Year: 2017).*
First Office Action and Search Report dated Apr. 14, 2020 for counterpart Chinese Patent Application No. 201810104596.8, along with machine EN translation downloaded from EPO.
Zhagn Chi et al., Study of High Temperature Silicate Cement Slurry, Drilling Fluid & Completion Fluid, vol. 34, No. 5, pp. 62-66 (2017).
Calcined phosphogypsum is used as cement retarder and fortifier, Cement Guide for New Epoch, vol. 5, May 2003, pp. 40-41.
First Office Action and search report dated Feb. 25, 2020 for counterpart Canadian Patent Application No. 3,032,137.

* cited by examiner

HIGH TEMPERATURE RESISTANT PORTLAND CEMENT SLURRY AND PRODUCTION METHOD THEREOF

CROSS-REFERENCE TO RELATED APPLICATIONS

This application claims the benefit of priority under 35 U.S.C. § 119 from Chinese Patent Application No. 201810104596.8, filed on Feb. 2, 2018, the disclosure of which is incorporated herein by reference in its entirety.

FIELD OF INVENTION

The invention belongs to the technical field of oil well cement, and relates to a high temperature resistant Portland cement slurry and a production method thereof.

BACKGROUND ART

At present, the heavy oil recovery is mainly based on thermal oil recovery, and the steam temperature is usually as high as 350° C. in the thermal oil recovery. Under high temperature thermal recovery conditions, the wellbore will experience the high temperature generated by the steam over multiple cycles. The oil well cement ring has the compressive strength degraded at high temperature, the permeability increases, and the stability and homogeneity of the cement stone are destroyed, which directly affects the wellbore integrity, greatly shortens the production life of the heavy oil thermal recovery well, and reduces the recovery efficiency. Therefore, it is necessary to develop a cement slurry system which can improve the compressive strength at high temperature and stably develop the long-term high-temperature compressive strength.

At present, Portland cement plus quartz sand, aluminate cement and aluminophosphate cement are mainly used as the cement slurry system for cementing. Although the high temperature compressive strength is higher than that of pure cement slurry, there are still some problems.

(1) The high temperature compressive strength of Portland cement plus quartz sand at 350° C. is severely degraded, and the cement ring is prone to lose the interlayer sealing ability.

(2) The price of aluminate cement or aluminophosphate cement is expensive, generally more than ten times that of Portland cement.

(3) It is difficult to develop admixtures such as fluid loss agent and retarder suitable for aluminate cement or aluminophosphate cement, and Portland cement has available matching admixtures.

(4) At present, the application of Portland cement in the cementing industry still occupies the main market, and almost all cementing equipments of various cementing construction units have been contacted with the Portland cement, but the aluminate cement or aluminophosphate cement will flocculate once it contacts Portland cement, which is very sensitive and can easily cause cementing accidents.

(5) The high temperature compressive strength of ordinary Portland cement plus quartz sand, aluminate cement, aluminophosphate cement at 350° C. is not high, about 20 MPa, and the long-term compressive strength tends to decline to around 5 MPa.

In view of this, it is necessary to develop a cement slurry system that is compatible with ordinary Portland cement and has long-term high temperature resistance and high compressive strength.

SUMMARY OF THE INVENTION

In view of the above disadvantages of the prior art, the object of the invention is to provide a high temperature resistant Portland cement slurry and a production method thereof. The high temperature resistant Portland cement slurry is compatible with ordinary Portland cement and has long-term high temperature resistance and high compressive strength.

In order to achieve the aforementioned object of the invention, the invention provides a high temperature resistant Portland cement slurry, characterized in that, the high temperature resistant Portland cement slurry comprises the following components by weight: 100 parts of an oil well Portland cement, 60-85 parts of a high temperature reinforcing material, 68-80 parts of fresh water, 1-200 parts of a density adjuster, 0.1-1.5 parts of a suspension stabilizer, 0.8-1.5 parts of a dispersant, 3-4 parts of a fluid loss agent, 0-3 parts of a retarder and 0.2-0.8 part of a defoamer.

According to a specific example of the invention, preferably, the oil well Portland cement comprises one or more of A grade, G grade, and H grade. The grade of the oil well Portland cement is defined in accordance with the GB 10238-98 Standard. The high temperature reinforcing material refers to a reinforcing material capable of withstanding a high temperature and enhancing the compressive strength of Portland cement at a temperature of 350° C. or higher.

The above high temperature resistant Portland cement slurry has a good sedimentation stability at normal temperature, and develops the strength rapidly at low temperature. The compressive strength is up to 40 MPa or more at a high temperature of 350° C., and the long-term high-temperature compressive strength develops stably without degradation. Therefore, it can meet the requirements for field application in heavy oil thermal recovery wells. The density of the high temperature resistant Portland cement slurry can be adjusted by using a density adjuster. In general, the density of the high temperature resistant Portland cement slurry can be adjusted to 1.20-2.4 $g/cm^3$ as desired.

According to a specific example of the invention, preferably, the high temperature reinforcing material comprises two or more reinforcing materials, and the reinforcing materials have a particle diameter of 0.005 mm to 0.15 mm.

According to a specific example of the invention, preferably, the high temperature reinforcing material can withstand a temperature of 350° C. or higher, and can allow the Portland cement to withstand a pressures of 40 MPa or more at a temperature of 350° C. or higher, even 50 MPa or more at a temperature of 350° C. or higher.

According to a specific example of the invention, the high temperature reinforcing material can allow the Portland cement to withstand a pressure of 40-100 MPa at a temperature of 350-600° C. and still maintain a good cement stone structure.

According to a specific example of the invention, preferably, the high temperature reinforcing material is formed by mixing 4-6 kinds of reinforcing materials.

According to a specific example of the invention, preferably, the high temperature reinforcing material is formed by mixing a reinforcing material A, a reinforcing material B, a reinforcing material C and a reinforcing material D in a mass ratio of 40-60:8-12:2-6:1-5; and the reinforcing material A, the reinforcing material B, the reinforcing material C and the reinforcing material D are reinforcing materials different from each other.

According to a specific example of the invention, preferably, the high temperature reinforcing material is formed by mixing a reinforcing material A, a reinforcing material B, a reinforcing material C, a reinforcing material D, a reinforcing material E and a reinforcing material F in a mass ratio of 40-60:1-3:2-6:1-5:2-4:1-3;

wherein the reinforcing material A, the reinforcing material B, the reinforcing material C, the reinforcing material D, the reinforcing material E and the reinforcing material F comprise at least 4 reinforcing materials different from each other.

According to a specific example of the invention, preferably, the reinforcing material A comprises any one of mullite, calcium hydroxide, magnesium silicate minerals, apatite, silica minerals, aluminates, sulfates, mica flakes, aluminum-containing minerals, mineral fibers, and whiskers;

the reinforcing material B comprises any one of mullite, calcium hydroxide, magnesium silicate minerals, apatite, silica minerals, aluminates, sulfates, mica flakes, aluminum-containing minerals, mineral fibers and whiskers;

the reinforcing material C comprises any one of mullite, calcium hydroxide, magnesium silicate minerals, apatite, silica minerals, aluminates, sulfates, mica flakes, aluminum-containing minerals, mineral fibers, and whiskers;

the reinforcing material D comprises any one of mullite, calcium hydroxide, magnesium silicate minerals, apatite, silica minerals, aluminates, sulfates, mica flakes, aluminum-containing minerals, mineral fibers, and whiskers;

the reinforcing material E comprises any one of mullite, calcium hydroxide, magnesium silicate minerals, apatite, silica minerals, aluminates, sulfates, mica flakes, aluminum-containing minerals, mineral fibers, and whiskers;

the reinforcing material F comprises any one of mullite, calcium hydroxide, magnesium silicate minerals, apatite, silica minerals, aluminates, sulfates, mica flakes, aluminum-containing minerals, mineral fibers, and whiskers;

preferably, the apatite comprises phosphate minerals;

preferably, the aluminum-containing minerals comprise metakaolin and/or plagioclase.

According to a specific example of the invention, preferably, the apatite comprises phosphate minerals.

According to a specific example of the invention, preferably, the aluminum-containing minerals comprise metakaolin.

The above reinforcing material A, reinforcing material B, reinforcing material C, reinforcing material D, reinforcing material E and reinforcing material F are reinforcing materials different from each other.

According to a specific example of the invention, preferably, the density adjuster comprises one or more of glass microbeads, floating beads, barite, and iron ore powder.

According to a specific example of the invention, preferably, the suspension stabilizer comprises one or more of attapulgite, diatomaceous earth, xanthan gum and Welan gum.

According to a specific example of the invention, preferably, the dispersant comprises sulfonated acetone-formaldehyde polymer.

According to a specific example of the invention, preferably, the fluid loss agent comprises 2-acrylamido-2-methylpropane sulfonic acid polymer or polyvinyl alcohol based polymer.

According to a specific example of the invention, preferably, the retarder comprises 2-acrylamido-2-methylpropane sulfonic acid polymer or phosphoric acid based polymer. The specific dispersant, fluid loss agent and retarder can be conventionally selected in the art.

According to a specific example of the invention, preferably, the defoamer comprises tributyl phosphate.

The invention further provides a method for producing the above high temperature resistant Portland cement slurry, comprising steps of:

dry mixing the high temperature reinforcing material, the fluid loss agent, the suspension stabilizer, the dispersant and the Portland cement to be uniform, to obtain a dry blend;

wet mixing the retarder, the defoamer and fresh water to be uniform, to obtain a wet blend;

adding the dry blend to the wet blend and stirring uniformly to obtain the high temperature resistant Portland cement slurry.

The invention further provides use of the above high temperature resistant Portland cement slurry in the cementing of heavy oil thermal recovery wells.

As compared with the prior art, the invention provides the following beneficial effects.

(1) The high temperature resistant Portland cement slurry provided by the invention has a good sedimentation stability, and develops the strength rapidly at low temperature, meeting the cementing demand in the early stage of the heavy oil steam injection thermal recovery.

(2) The high temperature resistant Portland cement slurry provided by the invention has a compressive strength of up to 40 MPa or more at a high temperature of 350° C., and the long-term high-temperature compressive strength develops stably without degradation.

(3) The high temperature resistant Portland cement slurry provided by the invention has a cost reduced by about half than the price of aluminate cement or aluminophosphate cement.

(4) The high temperature resistant Portland cement slurry provided by the invention does not need to separately develop the admixture and equipment for non-Portland cement, which greatly saves the cost for developing the cement slurry admixture and equipment.

(5) Since the high temperature resistant Portland cement slurry provided by the invention has a similar system to the conventional Portland cement, the contact would not result in flocculation or thickening, and the compatibility is good, which improves the safety of cementing construction and greatly reduces the cost for cementing construction work.

DETAILED DESCRIPTION OF PREFERRED EMBODIMENTS

In order to more clearly understand the technical features, objects, and advantages of the invention, the technical solutions of the invention will now be described in detail below, but it should not be construed as limiting the implementable scope of the invention.

EXAMPLE 1

This example provides a high temperature resistant Portland cement slurry composed of the following components in ratio by weight: 100 parts of Grade A Portland cement, 69 parts of a high temperature reinforcing material, 73 parts of fresh water, 1 part of sulfonated acetone-formaldehyde polymer dispersant, 3 parts of 2-acrylamido-2-methylpropane sulfonic acid polymer fluid loss agent, 0.6 part of 2-acrylamido-2-methylpropane sulfonic acid polymer retarder, 0.3 part of tributyl phosphate, 0.1 part of attapulgite and 2 parts of iron ore powder.

Among them, the high temperature reinforcing material is obtained by mixing silica minerals, plagioclase, whiskers, and sulfates in a mass ratio of 50:10:4:5; the obtained high temperature reinforcing material has a particle diameter of 0.01 mm to 0.15 mm.

In this example, the high temperature resistant Portland cement slurry is produced by steps of:

dry mixing the high temperature reinforcing material, the fluid loss agent, a suspension stabilizer, the dispersant and the Portland cement to be uniform, to obtain a dry blend;

wet mixing the retarder, a defoamer and fresh water to be uniform, to obtain a wet blend; and subsequently, under agitation, adding the dry blend to the wet blend and stirring uniformly to obtain the high temperature resistant Portland cement slurry, and then adjusting the density of the obtained high temperature resistant Portland cement slurry to 1.90 g/cm$^3$ using a density adjuster.

EXAMPLE 2

This example provides a high temperature resistant Portland cement slurry composed of the following components in ratio by weight: 100 parts of Portland cement, 70 parts of a high temperature reinforcing material, 75 parts of fresh water, 1.2 parts of sulfonated acetone-formaldehyde polymer dispersant, 3 parts of 2-acrylamido-2-methylpropane sulfonic acid polymer fluid loss agent, 1.2 parts of 2-acrylamido-2-methylpropane sulfonic acid polymer retarder, 0.3 part of tributyl phosphate, 0.2 part of attapulgite and 4 parts of iron ore powder.

Among them, the high temperature reinforcing material is obtained by mixing silica minerals, aluminates, mineral fibers, calcium hydroxide, phosphate minerals and magnesium silicate minerals in a mass ratio of 60:2:3:2:2:1; the obtained high temperature reinforcing material has a particle diameter of 0.01 mm to 0.15 mm Subsequently, the density of the obtained high temperature resistant Portland cement slurry is adjusted to 1.90 g/cm$^3$ using a density adjuster.

EXAMPLE 3

This example provides a high temperature resistant Portland cement slurry composed of the following components in ratio by weight: 100 parts of Portland cement, 78 parts of a high temperature reinforcing material, 77 parts of fresh water, 1.2 parts of sulfonated acetone-formaldehyde polymer dispersant, 3 parts of 2-acrylamido-2-methylpropane sulfonic acid polymer fluid loss agent, 1.2 parts of 2-acrylamido-2-methylpropane sulfonic acid polymer retarder, 0.3 part of tributyl phosphate, 0.1 part of attapulgite and 2 parts of iron ore powder.

Among them, the high temperature reinforcing material is obtained by mixing silica minerals, metakaolin, mineral fibers, phosphate minerals and magnesium silicate minerals in a mass ratio of 60:10:4:3:1; the obtained high temperature reinforcing material has a particle diameter of 0.01 mm to 0.15 mm Subsequently, the density of the obtained high temperature resistant Portland cement slurry is adjusted to 1.90 g/cm$^3$ using a density adjuster.

EXAMPLE 4

This example provides a high temperature resistant Portland cement slurry composed of the following components in ratio by weight: 100 parts of Portland cement, 75 parts of a high temperature reinforcing material, 74 parts of fresh water, 1.1 parts of sulfonated acetone-formaldehyde polymer dispersant, 3 parts of 2-acrylamido-2-methylpropane sulfonic acid polymer fluid loss agent, 1.2 parts of 2-acrylamido-2-methylpropane sulfonic acid polymer retarder, 0.3 part of tributyl phosphate, 0.1 part of attapulgite and 0 part of iron ore powder.

Among them, the high temperature reinforcing material is obtained by mixing silica minerals, metakaolin, mineral fibers, sulfates and mullite in a mass ratio of 60:8:4:1:2; the obtained high temperature reinforcing material has a particle diameter of 0.01 mm to 0.15 mm Subsequently, the density of the obtained high temperature resistant Portland cement slurry is adjusted to 1.90 g/cm$^3$ using a density adjuster.

COMPARATIVE EXAMPLE 1

This comparative example provides an oil well Portland cement slurry composed of the following components in ratio by weight: 100 parts of oil well Portland cement, 40 parts of sand, 3 parts of 2-acrylamido-2-methylpropane sulfonic acid polymer fluid loss agent, 0.2 part of 2-acrylamido-2-methylpropane sulfonic acid polymer, 0.4 part of sulfonated acetone-formaldehyde polymer dispersant and 46 parts of water. The density of the oil well Portland cement slurry is adjusted to 1.90 g/cm$^3$.

COMPARATIVE EXAMPLE 2

This comparative example provides an oil well aluminate cement slurry composed of the following components in ratio by weight: 100 parts of oil well aluminate cement, 30 parts of ultrafine slag, 3 parts of 2-acrylamido-2-methylpropane sulfonic acid polymer fluid loss agent, 0.2 part of 2-acrylamido-2-methylpropane sulfonic acid polymer, 0.4 part of sulfonated acetone-formaldehyde polymer dispersant, 0.39 part of phosphate retarder and 51 parts of water. Subsequently, the density of the oil well aluminate cement slurry is adjusted to 1.90 g/cm$^3$ using barite.

TEST EXAMPLE 1

This test example tested the performance of the high temperature resistant Portland cement slurries of Examples 1-4 and the cement slurries of Comparative Examples 1-2.

Testing conditions: 70° C.×35 MPa×30 min

Table 1 shows the test results of performance of the high temperature resistant Portland cement slurries of Examples 1-4 and the cement slurries of Comparative Examples 1-2. As known from the data in the table below, the cement slurries of Examples 1-4 and Comparative Examples 1-2 have similar performances, and all can meet the requirements of engineering applications.

TABLE 1

| Test items | Density (g/cm$^3$) | Flow-ability (cm) | API filter loss (mL) | Free liquid amount (%) | Thickening time (70 Bc/min) |
|---|---|---|---|---|---|
| Example 1 | 1.90 | 21 | 24 | 0 | 164 |
| Example 2 | 1.90 | 21 | 22 | 0 | 172 |
| Example 3 | 1.90 | 20 | 20 | 0 | 158 |
| Example 4 | 1.90 | 21 | 20 | 0 | 169 |

TABLE 1-continued

| Test items | Density (g/cm³) | Flow-ability (cm) | API filter loss (mL) | Free liquid amount (%) | Thickening time (70 Bc/min) |
|---|---|---|---|---|---|
| Comparative Example 1 | 1.90 | 22 | 38 | 0 | 177 |
| Comparative Example 2 | 1.90 | 21 | 36 | 0 | 192 |

TEST EXAMPLE 2

In this test example, each of the high temperature resistant Portland cement slurries of Examples 1-4 and the cement slurries of Comparative Examples 1-2 was filled into a strength mold to make a cement stone, and then cured at 70° C.×20.7 MPa for 3 days to form an initial state, and then cured at 350° C.×20.7 MPa for 7 days to form a first round, and then cured at 350° C.×20.7 MPa for every 10 days to form a round, and the compressive strength of the cement stone was tested after each curing round. Table 2 shows the strength test results of the high temperature resistant Portland cement stones of Examples 1-4 and the cement stones made by cement slurries of Comparative Examples 1-2 after different rounds of curing. As known from the data in the table below, the compressive strengths of the high temperature resistant Portland cement stones developed by the present application exceed 40 MPa, and the long-term strengths do not decline; while the cement stones of the Comparative Examples have compressive strengths of less than 10 MPa, and the long-term strengths are severely degraded. Therefore, the performance of the high temperature resistant Portland cement slurry system is superior to that of the cement slurry system of the Comparative Examples.

TABLE 2

| Test items | Compressive strength (MPa) | | | | | Notes cement stone structure |
|---|---|---|---|---|---|---|
| | Initial state at 70° C. | 1 | 2 | 3 | 4 | state after curing |
| Example 1 | 26.6 | 37.7 | 39.2 | 40.6 | 41.2 | complete cement stone |
| Example 2 | 23.3 | 42.3 | 43.5 | 45.7 | 51.1 | complete cement stone |
| Example 3 | 25.4 | 41.1 | 42.7 | 43.3 | 45.4 | complete cement stone |
| Example 4 | 27.9 | 39.6 | 41.3 | 41.9 | 42.7 | complete cement stone |
| Comparative Example 1 | 28.8 | 11.8 | — | — | — | cement stone ruptured in the first round |
| Comparative Example 2 | 18.2 | 4.8 | — | — | — | loose cement stone structure in the first round |

It can be seen from Table 2 that the oil well Portland cement slurry produced in Comparative Example 1 has been ruptured after 10 days, one round of curing at 350° C.×20.7 MPa, and the oil well aluminate slurry produced in Comparative Example 2 has a loose structure after 10 days, one round of curing at 350° C.×20.7 MPa. The high temperature resistant Portland cement slurries produced in Examples 1-2 are more resistant to high temperatures and high pressures than the common oil well Portland cement slurries and oil well aluminate cement slurries in Comparative Examples 1-2, while keeping a complete cement stone structure after 40 days, four rounds of curing.

In conclusion, the high temperature resistant Portland cement slurry provided by the invention has a good sedimentation stability, and the strength develops rapidly at low temperature, meeting the cementing demand in the early stage of the heavy oil steam injection thermal recovery. Moreover, the high temperature resistant Portland cement slurry provided by the invention has a compressive strength of up to 40 MPa or more at a high temperature of 350° C., and the long-term high-temperature compressive strength develops stably without degradation, reaching the level of Grade G Portland cement for cementing oil and gas well. As compared with Comparative Examples 1-2, the high temperature resistant Portland cement slurry provided by the invention has a cost reduced by about half than the price of aluminate cement or aluminophosphate cement, and does not need to separately develop the admixture and equipment for non-Portland cement, which greatly saves the cost for developing the cement slurry admixture and equipment. Most importantly, because the high temperature resistant Portland cement slurry provided by the invention has a similar system to the conventional Portland cement, the contact would not result in flocculation and thickening, and the compatibility is good, which improves the safety of cementing construction and greatly reduces the cost of cementing construction work.

The invention claimed is:

1. A high temperature resistant Portland cement slurry, characterized in that, the high temperature resistant Portland cement slurry comprises the following components by weight: 100 parts of an oil well Portland cement, 70 parts of a high temperature reinforcing material, 75 parts of fresh water, parts of a density adjuster, 0.1 parts of a suspension stabilizer, 1.2 parts of a dispersant, 3 parts of a fluid loss agent, 1.2 parts of a retarder and 0.3 part of a defoamer;
   the high temperature reinforcing material is formed by mixing a reinforcing material A, a reinforcing material B, a reinforcing material C, a reinforcing material D, a reinforcing material E and a reinforcing material F in a mass ratio of 60:2:3:2:2:1; wherein the reinforcing material A, the reinforcing material B, the reinforcing material C, the reinforcing material D, the reinforcing material E and the reinforcing material F comprise 6 reinforcing materials different from each other;
   the reinforcing material A comprises silica minerals;
   the reinforcing material B comprises aluminates;
   the reinforcing material C comprises mineral fibers;
   the reinforcing material D comprises phosphate minerals;
   the reinforcing material E comprises calcium hydroxide;
   the reinforcing material F comprises magnesium silicate minerals:
   the reinforcing materials have a particle diameter of 0.01 mm to 0.15 mm;
   the density adjuster comprises iron ore powder;
   the suspension stabilizer comprises attapulgite;
   the dispersant comprises sulfonated acetone-formaldehyde polymer;
   the fluid loss agent comprises 2-acrylamido-2-methylpropane sulfonic acid polymer;
   the retarder comprises 2-acrylamido-2-methylpropane sulfonic acid polymer;
   the defoamer comprises tributyl phosphate.

2. The high temperature resistant Portland cement slurry according to claim 1, characterized in that, the oil well Portland cement comprises one or more of Grade A, Grade G, and Grade H.

3. The high temperature resistant Portland cement slurry according to claim 1, characterized in that, the high temperature reinforcing material can withstand a temperature of 350° C. or higher, and can allow the Portland cement to withstand pressures of 40 MPa or more at the temperature of 350° C. or higher.

4. The high temperature resistant Portland cement slurry according to claim 1, characterized in that, the phosphate minerals comprise apatite.

5. A method for producing the high temperature resistant Portland cement slurry according to claim 1, comprising steps of:
- dry mixing the high temperature reinforcing material, the fluid loss agent, the suspension stabilizer, the dispersant and the Portland cement to be uniform, to obtain a dry blend;
- wet mixing the retarder, the defoamer and fresh water to be uniform, to obtain a wet blend; and
- adding the dry blend to the wet blend and stirring uniformly to obtain the high temperature resistant Portland cement slurry.

\* \* \* \* \*